United States Patent Office 3,534,399
Patented Oct. 13, 1970

1

3,534,399
AREA NAVIGATION METHOD AND APPARATUS FOR AIRCRAFT WITH VHF-OMNIRANGE (VOR) AND DISTANCE MEASURING EQUIPMENT (DME)
Charles J. Hirsch, Princeton, N.J., assignor to RCA Corporation, a corporation of Delaware
Filed July 22, 1968, Ser. No. 746,600
Int. Cl. G01c 21/20; G01s 1/44; G06f 15/50
U.S. Cl. 235—150.27                    20 Claims

ABSTRACT OF THE DISCLOSURE

An area navigation computer on board an aircraft makes use of attenuating, phase shifting and sampling the 30 hertz output signals from a VOR receiver aboard the aircraft in accordance with the known, fixed polar coordinates of a given position with respect to the ground station transmitting to the VOR receiver and in accordance with the then-existing distance of the aircraft from this ground station, as measured by a DME aboard the aircraft, in a manner such as to eliminate the sinusoidal variations exhibited by these VOR output signals while utilizing the relative phase information contained therein to solve certain predetermined trigonometric functions required to provide a transformation of coordinates by which the polar coordinates of the aforesaid given position with respect to the then-existing position of the aircraft are determined.

---

This invention relates to air navigation equipment, and, more particularly, to an improved area navigation computer for an aircraft equipped with a VOR and a DME.

VHF-Omnirange (VOR) is one of the most useful and widespread navigation devices. It supplies the azimuth in degrees from North of an aircraft with respect to a preselected one of a plurality of transmitting ground stations, utilized for both VOR and DME, which are distributed over the country at known predetermined locations.

For VOR purposes, each ground station is assigned a given 50 kHz. channel within the 108.0 to 117.9 mHz. frequency band and emits two RF signals within its assigned channel which are separated by 9960 hertz in frequency. One of these signals, which is called the "reference-phase" signal, is frequency modulated at 30 hertz and radiated by an omnidirectional antenna, so that it is received with the same phase at all points which are equi-distant from the antenna. The other of these signals which is called the "variable-phase" signal, is not modulated at the transmitter, but is radiated from a directional antenna with a cardioid pattern which rotates at the rate of 30 revolutions per second. This directional antenna is concentric with the omnidirectional antenna which radiates the "reference-phase" signal. The received "variable-phase" signal, at any point in space, will be amplitude-modulated at 30 hertz because of the rotation of the cardioid pattern at 30 revolutions per second. The phase of this 30 hertz amplitude-modulated signal at any azimuth will differ from the phase thereof at any other azimuth by the difference in the azimuth of the two places. The 30 hertz frequency modulation of the "reference-phase" signal is synchronized with the 30 r.p.s. of the cardioid pattern of the "variable" signal so that the received 30 hertz amplitude-modulated variable-phase signal will coincide with the received 30 hertz frequency-modulated "reference-phase" signal solely in the due North direction with respect to the transmitting ground station. In any other direction, these two signals will differ in phase by an amount equal to the azimuth of that direction with respect to the transmitting ground station.

A VOR receiver aboard an aircraft receives the two RF signals transmitted from a particular ground station to which it is tuned and demodulates these two RF signals to provide at its output a first 30 hertz signal having a phase which manifests the "reference-phase" and a second 30 hertz signal having a phase which manifests the "variable-phase."

Another one of the most useful and widespread navigation devices for an aircraft is distance measuring equipment (DME). Briefly, DME aboard an aircraft, an example of which is described in detail in United States Pat. No. 3,320,612, issued to R. P. Crow et al. on May 16, 1967, transmits an interrogation pulse signal at an appropriate carrier frequency to the same preselected one of the ground stations used for transmitting the received VOR information. Transponder equipment located at this ground station transmits answering pulse signals in response to received interrogation pulse signals. The DME aboard an aircraft measures the then-existing distance between that aircraft and the ground station from which it is receiving answering pulses in accordance with the length of the time interval between the transmission of an interrogation pulse signal therefrom and the receipt thereby of an answering pulse signal from the ground station. The measured distance is indicated at the DME by means of a shaft position which controls the setting of a mechanical counter.

It is often desired to navigate an aircraft equipped with a VOR and a DME with respect to a given position, other than the ground station to which the aircraft's VOR and DME is tuned, which has predetermined known fixed polar coordinates with respect to that ground station. More particularly, since the polar coordinates of the given position with respect to the ground station are known a priori and the then-existing polar coordinates of the aircraft with respect to the ground station are measured by means of the VOR and DME aboard the aircraft, it is possible by trigonometry to provide a transformation of coordinates by which the polar coordinates of the given position with respect to the then-existing position of the aircraft are determined. In order to accomplish this, it is necessary to provide aboard the aircraft area navigation computer means for continuously making the required coordinate transformation in response to the application thereto of the respective "reference-phase" and "variable-phase" output signals from the VOR and the output from the DME, and by the setting therein of the predetermined known fixed polar coordinates of the given position with respect to the ground station. Further, it is desirable that the computer means include adjustable means for taking care of the case where the course line of the desired flight path is offset a specified amount from the given position.

In the past, computer means for solving the trigonometry involved in the above-discussed area navigation have been relatively complex and costly. This relatively high cost made it impractical to utilize area navigation to any great extent, especially with smaller general aircraft. The present invention is directed to relatively simple and inexpensive computer means required for an area navigation system abroad an aircraft that incorporates a VOR receiver and a DME which makes it practical to extend the benefits of area navigation to nearly all aircraft and the method of utilizing such computer means.

Briefly, the present invention makes use of attenuating, phase-shifting and sampling of the 30 hertz output signals from the VOR receiver in accordance with the azimuth and distance of the given position with respect to the ground station and in accordance with the then-existing distance of the aircraft from the ground station as measured by the DME in a manner such as to eliminate the sinusoidal time-varying properties exhibited by these VOR output signals, while utilizing the relative phase information contained therein to solve certain predetermined trigonometric functions.

Therefore, it is an object of the present invention to provide an improved aircraft area navigation method and apparatus.

This and other objects, features and advantages of the present invention will become more apparent from the following detailed description taken together with the accompanying drawings in which:

FIG. 1 is a coordinate plot showing the trigonometric relationship among the then-existing position of an aircraft, the position of a ground station and a predetermined known fixed given position;

FIG. 2 is an illustrative block diagram of one embodiment of an area navigating computer means employing the present invention;

FIG. 3 shows a plurality of signal function graphs which are helpful in understanding the operation of the embodiment of the present invention shown in FIG. 2;

FIG. 4 is a block diagram of a modification of the embodiment of the present invention shown in FIG. 2;

FIG. 5 is a block and schematic diagram of an inexpensive variable time delay means particularly suitable for providing an adjustable phase shift in the modification of FIG. 4; and FIG. 6 shows a plurality of signal function graphs which are helpful in understanding the operation of the embodiment of the present invention shown in FIGS. 4 and 5.

Referring now to FIG. 1, G.S. represents the location of a ground station, which is located at the origin of the coordinate plot defined by the N or North coordinate and E or East coordinate. Point A represents the actual position at a given time of an aircraft having a VOR receiver and a DME on board with respect to the ground station. As shown, the azimuth relative to North of aircraft A with respect to the ground station is $\theta$. The radial distance of aircraft A with respect to the ground station is $\rho$. Point K represents the predetermined known fixed given position with respect to the ground station. As shown, the azimuth relative to North of given position K with respect to the ground station is $\phi$. The radial distance of given position K from the ground station is $r$. Further, the azimuth relative to North of the given position K with respect to aircraft A is $\alpha$ and the radial distance of the given position K from aircraft A is $d$.

From the coordinate plot of FIG. 1, it can be seen that the following trigonometric equations hold true:

(1) $\qquad l = r \sin(\phi - \alpha) = \rho \sin(\theta - \alpha)$ (2) $\qquad d = r \cos(\phi - \alpha) - \rho \cos(\theta - \alpha)$ In Equation 1 and 2, the values $r$ and $\phi$ are the known polar coordinates of the given position K, while $\theta$ is manifested by the phase angle between the "variable-phase" and "reference-phase" output signals of the VOR and $\rho$ is manifested by the output of the DME. Therefore, all the independent variables except $\alpha$ is Equations 1 and 2 are immediately available to an area navigation computer means for solving Equations 1 and 2. However, if $\alpha$ is made an adjustable parameter of such computer means, and is then adjusted to that given value thereof which makes the two different expressions for $l$ in Equation 1 equal to each other, this given value to which $\alpha$ is adjusted will be the proper value of $\alpha$ to provide the correct solution for Equation 2, thereby ascertaining the value of $d$. Such a computer means is illusrtated in each of FIGS. 2 and 4.

Referring now to FIG. 2, a first signal output from the VOR receiver, which is a 30 hertz sine wave having the reference phase sin $\omega t$ and the amplitude $E_1$, is applied across potentiometer 204 and is also applied across potentiometer 206. The wiper of potentiometer 204 is set to a value proportional to distance $r$ and the wiper of potentiometer 206 is automatically set by being mechanically linked to the output shaft of the DME to a value proportional to the distance $\rho$.

The signal appearing at the wiper of potentiometer 204, described by $rE_1 \sin \omega t$, which is shown in curve 1 of FIG. 3a, is applied as an input to sampling means 210 and is also applied as an input to quadrature phase shifter 212. The output of phase shifter 212, which is shown in curve 2 of FIG. 3a, is applied as an input to sampling means 214. It is described by $rE_1 \cos \omega t$. The reference phase signal $E_1 \sin \omega t$ is applied as an input to adjustable phase-shifter 208, which provides a phase shift equal to $\phi$, the bearing of point K. This signal is now equal to $E_1 \sin(\omega t + \phi)$ and is shown as curve 1 of FIG. 3b. This signal is then applied to adjustable phase shifter 200 which provides a phase shift of $(-\alpha)$. The output of this second adjustable phase shifter is shown as curve 2 of FIG. 3b and is described by $E_1 \sin(\omega t + \phi - \alpha)$. The output of 200 is then applied to the reference-phase signal sampling pulse generator 202.

Reference-phase signal sampling pulse generator 202 includes a limiter and differentiator circuit for producing a first sampling pulse output, shown in FIG. 3c, in response to each positive-going zero crossover of the modified reference phase first signal applied as an input thereto. The first sampling pulse output from generator 202 is applied as a control signal to each of sampling means 210 and 214 to effect the sampling of the instantaneous level of the sine wave signals, then being applied thereto from phase shifters 208 and 212, respectively.

Each of sampling means 210 and 214 includes normally open switch means for sampling the instantaneous level of the input applied thereto in response to the closing of the switch means and, preferably, also includes means for storing the sample level until the next sampling. For instance, the switching means of each of sampling means 210 and 214 may comprise a conventional diode quad and the storing means may include a conventional integrating operational amplifier. Another example of a switching means and storing means that can be made inexpensively as an integrated circuit is an MOS FET circuit which takes advantage of the extremely high input impedance of MOS field effect tansistors in their cutoff condition for storing the sampled signal between samplings.

The output appearing on the wiper of potentiometer 206, which is shown in curve 1 of FIG. 3d, is applied as an input to sampling means 216 and is also applied as an input to quadrature phase shifter 218. The output from phase shifter 218, which is shown in curve 2 of FIG. 3d, is applied as an input to sampling means 220. Sampling means 216 and 220 are identical in structure and function to sampling means 210 and 214 described above.

The variable phase second output signal from the VOR, which is designated by the function $E_2 \sin(\omega t + \theta)$ shown in curve 1 of FIG. 3e, is applied as an input to adjustable phase shifter 200a to shift the variable phase signal by $-\alpha°$. Adjustable phase shifter 200a is mechanically coupled to identical adjustable phase shifter 200 to provide both adjustments simultaneously. The output of phase shifter 200a is then $E_2 \sin(\omega t + \theta - \alpha)$ and is shown in curve 2 of FIG. 3e. It is then applied to variable-phase signal sampling pulse generator 222. Generator 222 includes a limiter and differentiator circuit for producing a second sampling pulse output shown in FIG. 3f, in response to each positive-going zero crossover of the variable phase signal applied as an input thereto. The second sampling pulse output from generator 222 is applied as a control signal to each of sampling means 216 and 220 to effect the sampling of the instantaneous level of the sine wave signal then being applied thereto from potentiometer 206 and phase shifter 218, respectively.

The output sample voltage of sampling means 210, which is derived across load resistance 224, is a DC signal having a level and polarity indicative of the value $rE_1 \sin(\phi-\alpha)$. The output sample voltage of sampling means 214, which is derived across load resistance 226 is a DC signal having a level and polarity indicative of the value $rE_1 \cos(\phi-\alpha)$. The output sample voltage of sampling means 216, which is derived across load resistance 228, is a DC signal having a level and polarity indicative of the value $\rho E_1 \sin(\theta-\alpha)$. The output sample voltage of sampling means 220, which is derived across load resistance 230, is a DC signal having a level and polarity indicative of the value $\rho E_1 \cos(\theta-\alpha)$.

Distance meter means 232 is connected as shown between load resistance 226 of sampling 214 and load resistance 230 of sampling means 220, whereby distance meter means 32 will indicate the difference between the output sample voltage of sampling means 214 and the output sample voltage of sampling means 220. With switch 234 in its *a* switch position, course deviation indicator 236 is connected as shown directly between load resistance 224 of sampling means 210 and load resistance 228 of sampling means 216, whereby course deviation indicator 236 indicates the difference between the output sample voltage of sampling means 210 and the output sample voltage of sampling means 216.

FIG. 2 further includes means for biasing course deviation indicator 236 when switch 234 is in its *b* switch position. This biasing means consists of potentiometer 238 connected across two serially-connected voltage sources each having a value of $E_b$. As shown, the midpoint of potentiometer 238 and the midpoint of the voltage source are both connected to the output of sampling means 216 appearing across load resistance 228. Switch 234, when in its *b* position, is effective in connecting course deviation indicator 236 between load resistance 224 of sampling means 210 and the adjustable wiper of potentiometer 238, whereby course deviation indicator 236 will indicate the difference between the output sample voltage appearing across load resistance 224 and the voltage appearing at the adjustable wiper of potentiometer 238.

Referring now to the operation of the apparatus shown in FIG. 2, switch 234 is initially placed in its *a* switch position, adjustable phase shifter 208 is adjusted to the known azimuth $\phi$ of the given position with respect to the ground station. Potentiometer 204 is adjusted to a value proportional to the known distance $r$ between the given position and the ground station, and potentiometer 206 is automatically adjusted by the shaft output of the DME to which it is mechanically coupled to a value proportional to the distance $\rho$ between the aircraft and the ground station as measured by the DME. In general, these adjustments to potentiometers 204 and 206 and to phase shifter 208 will not in and of themselves cause the output sample voltage from sampling means 210 appearing across load resistance 224 and the output sample voltage from sampling means 216 appearing across load resistance 228 to be equal to each other. Therefore, course deviation indicator 236 will indicate some other value than zero. However, by manually adjusting adjustable phase shifter 200 to change the value of the phase shift angle $\alpha$ to that given value thereof which causes course deviation indicator 236 to indicate zero, the output sample voltage of sampling means 210 appearing across load resistance 224 may be made equal to the output sample voltage of sampling means 216 appearing across load resistance 228. Thus, this given value of the phase shift angle $\alpha$ is the value thereof which solves trigonometric Equation 1 discussed above in connection with FIG. 1. Further, the distance indicated by distance meter means 232 when phase shift angle $\alpha$ is adjusted to the aforesaid given value thereof is the solution of trigonometric Equation 2, discussed above in connection with FIG. 1.

If after adjustable phase shifter 200 is adjusted to provide that given value of phase shift angle $\alpha$ which causes course deviation indicator 236 to provide a zero indication, the pilot flies a flight path which maintains the zero indication of course deviation indicator 236, the course line of this flight path will be the line determined by points A and K of FIG. 1. As the aircraft flies along this course line, distance meter means 232 will continuously indicate the correct then-existing distance between the aircraft and the given position.

Therefore with switch 234 in its *a* switch position the course line of the flight path of the aircraft must intersect the given position K in FIG. 1. However, it is often desired to navigate the aircraft with respect to the given position K, whose polar coordinates with respect to the ground station are fixed, known and predetermined, while flying an flight path whose course line is spaced a desired distance from this given position K of FIG. 1, rather than intersecting this given position. In this latter case, after adjustable phase shifter 200 is adjusted to provide that given value of phase shift angle $\alpha$ to cause course deviation indicator 236 to provide a zero indication with switch 234 in its *a* switch position, switch 234 is switched to its *b* switch position to introduce the biasing means into the circuit with course deviation indicator 236. With switch 234 in its *b* switch position, the adjustable wiper of potentiometer 238 is offset from the midpoint thereof in a direction and by an amount determined by the location of the desired offset course line of the flight path with respect to given position K of FIG. 1. This will result in course deviation indicator 236 indicating some certain deviation, either to the left or right as the case may be, from zero. The pilot can then reach his desired offset course line by flying the aircraft in that direction, to the left or right as the case may be, which brings the indication of course deviation indicator 236 back to zero. After the aircraft has reached its desired offset course line, its flight path may be kept thereon by piloting the aircraft to maintain course deviation indicator 236 at its zero indication. This will result in the flight path of the aircraft having an offset course line which is spaced from but is parallel to the line determined by point A and point K of FIG. 1. In this case, after the desired offset course line is reached, so that course deviation indicator 236 indicates zero, distance meter means 232 will continuously indicate the correct distance between the then-existing position of the aircraft and the projection of the given position point K on the desired offset course line.

Referring now to FIG. 4, there is shown a modification of the apparatus of FIG. 2. In FIG. 4, elements 204, 206, 210, 212, 214, 216, 218 and 220 are identical in structure and function to their correspondingly numbered elements of FIG. 2. In addition, although not specifically shown in FIG. 4, the outputs of sampling means 210, 214, 216 and 220 are coupled to a course deviation indicator and a distance meter means in a manner identical to that shown in FIG. 2.

However, as opposed to FIG. 2, in FIG. 4 adjustable phase shifters 200 and 208 and reference phase signal sampling pulse generator 202 are replaced by phase shifter 400, monostable multivibrator 402, and first adjustable time delay means 404. Adjustable phase shifter 200a and variable-phase signal sampling pulse generator 222 are replaced by phase shifter 406, monostable multivibrator 408, and second adjustable second time delay means 410.

Phase shifter 400 shifts the phase of the signal output therefrom with respect to the signal input thereto in a negative direction by a fixed certain angle such as 15 degrees. The input to phase shifter 400 is shown in FIG. 6*a* and the output from phase shifter 400 is shown in FIG. 6*b*. They differ in phase with respect to each other by 15 degrees, as shown in FIG. 6*c*.

The output from phase shifter 400 is applied as an input to monostable multivibrator 402, which in response thereto produces a first control pulse having its leading edge in time coincidence with the zero degree crossover of the output from phase shifter 400. This first control pulse has a fixed certain duration, such as 420 degrees, which, as shown in FIG. 6d is greater than one and less than two periods of the sinusoidal output signal from the VOR. First control pulses from monostable multivibrator 402 are applied as an input to first adjustable time delay means 404 which, as will be described in more detail below, produces a first sampling pulse as an output therefrom after angular delay ($\phi-\alpha$) which can be adjusted from a minimum value equal to the phase shift provided by phase shifter 400 to a maximum value which exceeds this minimum value by at least 360 degrees, but which is less than the duration of a first control pulse. First sampling pulses from adjustable time delay means 404 are applied as a control signal to sampling means 210 and 214 in the same manner as previously described in connection with FIG. 2.

The variable phase sinusoidal output signal from the VOR is applied as an input to phase shifter 406, which is identical to phase shifter 400, and produces as an output a sinusoidal wave which is shifted in phase with respect to a signal input thereto in a negative direction by a fixed certain angle, such as 15 degrees. The input to phase shifter 400 and the output therefrom will be similar to the waves shown respectively in FIG. 6a and FIG. 6b, except that they will be phase displaced with respect thereto by an amount equal to the azimuth $\theta$ of the aircraft.

The output from phase shifter 406 is applied as an input to monostable multivibrator 408, which in response thereto produces a second control pulse having its leading edge in time coincidence with the zero degree crossover of the output from phase shifter 406.

This second control pulse has a fixed certain duration, such as 420 degrees, which is greater than one and less than two periods of a sinusoidal output from the VOR. Second control pulses from monotabsle multivibrator 408 are applied as an input to second adjustable time delay means 410, which produces a second sampling pulse as an output therefrom after a time delay $\alpha$ which can be adjusted from a minimum value equal to the phase shift provided by phase shifter 406 to a maximum value which exceeds this minimum value by at least 360 degrees, but which is less than the duration of a control pulse from monostable multivibrator 408. Second sampling pulses from adjustable time delay means 410 are applied as a control signal to sampling means 216 and 220 in the same manner as previously described in connection with FIG. 2.

A circuit which is particularly suitable for use as first time delay means 404, and which may utilize integrated circuitry to a large extent is shown in FIG. 5. An electronic switch, which is shown schematically as element 500, of switch means 501 is effective when closed in providing a charging circuit having a short time constant for charging capacitance 502 to the voltage V of DC voltage source 504. Capacitance 502 is provided with a discharge circuit consisting of resistance 506 including a first linearly adjustable resistance portion 506a thereof which may be varied from a minimum value thereof when wiper 508a is adjusted to point 511 to a maximum value thereof when wiper 508a is adjusted to point 510. Resistance 506 further includes a second independently linearly adjustable resistance portion 506b serially connected to first linearly adjustable resistance portion 506a which may be varied from a minimum value thereof when wiper 508b is adjusted to point 511 to a maximum value thereof when wiper 508b is adjusted to ground point 512. However, so long as switch 500 is closed, this discharge circuit is without effect and capacitance 502 remains charged to voltage V. Switch 500 of switch means 501 is normally closed, but is opened during the existence of each first control pulse applied as an input thereto from monostable multivibrator 402. Capacitance 502 discharges through resistance 506 while switch 500 is opened. As will become more apparent later, the leading edge of each first control pulse applied to switch means 501 acts as a first start signal which initiates a first time delay interval.

Connected across voltage source 504 is adjustable voltage divider 516 having a movable tap 518 connected as a first input to comparison means 520. The voltage across capacitance 502 is applied as a second input to comparison means 520. Comparison means 520, which may be a differential amplifier for instance, produces an output pulse in response to the potential at its first and second inputs being equal to each other. The output pulse from comparison means 520 is utilized as the first sampling pulse output of the adjustable first time delay means.

Considering now the operation of the adjustable first time delay means shown in FIG. 5, at the time switch 500 is opened in response to a first control pulse being applied to switch means 501 from monostable multivibrator 402, capacitance 502 has already been charged to its maximum voltage V. Therefore, the potential at the second input of comparison means 520 will then be higher than the potential applied to the first input of comparison means 520 from movable tap 518 of voltage divider 516. However, in response to the opening of switch 500, capacitance 502 begins to discharge through resistance 506 at a rate which is determined by the respective resistance values to which each of serially connected linearly adjustable resistance portions 506a and 506b is then adjusted. When capacitance 502 has discharged to that point where the respective potentials of the first and second inputs to comparison means 520 are equal to each other, an output pulse from comparison means 520 will be applied as a first sampling pulse to sampling means 210 and 214 of FIG. 4. Capacitance 502 will continue to be discharged through resistance 506 until the termination of the first control pulse then being applied to switch means 501. In response to the termination of this first control pulse, however, switch 500 of switch means 501 is closed, causing capacitance 502 to again be charged up to its maximum voltage V before the application of the next occurring first control pulse to switch means 501.

It will be seen that the time between the occurrence of a first start signal, manifested by the leading edge of a first control pulse, and the next-occurring first sampling pulse obtained from the output of comparison 520 depends both on the setting of movable tap 518 of voltage divider 516 and the respective settings of wipers 508a and 508b of linearly adjustable resistance portions 506a and 506b. It is desirable that the time delay between the first sampling pulse and the first start signal be continuously variable over an interval at least equal to one period of the output signals from the VOR, i.e., $\frac{1}{30}$ of a second. At the same time it is essential that the minimum resistance to which resistance 506 can be adjusted is sufficiently high as not to short circuit capacitance 502 and thereby prevent capacitance 502 from being charged to voltage V. Therefore, has to be some minimum time delay between the occurrence of a first start signal and the occurrence of a first sampling pulse in response thereto which is greater than zero. This minimum time delay is made to be just equal and opposite to the phase shift provided by phase shifter 400, i.e., $\frac{1}{720}$ of a second or 15 degrees of the output sinusoidal signals obtained from the VOR. This is accomplished by adjusting each of wipers 508a and 508b to provide resistance 506 with its predetermined minimum resistance. Then, movable tap 518 of voltage divider 516 is adjusted to that point at which the time delay between the occurrence of a first start signal manifested by the leading edge of a first control pulse and the occurrence of a first sampling pulse in response thereto is exactly equal to the required minimum time delay.

The maximum value of resistance 506 is chosen to be sufficiently great so that in the case where linearly adjustable resistance portion 506a has its minimum value and linearly adjustable resistance 506b has its maximum value and also in the case where linearly adjustable resistance portion 506a has its maximum value and linearly adjustable resistance portion 506b has its minimum value, the time delay provided will exceed the minimum time delay by at least one period of the output signals obtained from the VOR, 1/30 of a second, but is less than the duration of a first control pulse, i.e., 420 degrees in the illustrative example shown in FIG. 6d.

The position of wiper 508a of linearly adjustable resistance portion 506a is manually controlled by a knob which is calibrated in degrees of phase angle over an interval of at least 360 degrees and is utilized for entering the known azimuth of the given position into the computer. The position of wiper 508b of linearly adjustable resistance portion 506b is also manually controlled by a knob which is calibrated in degrees of phase angle over an interval of at least 360 degrees and is utilized for entering an adjustable value of the phase shift angle $\alpha$ into the computer.

FIG. 6e shows the discharging characteristics of capacitance 502 during the presence of a first control pulse and the charging characteristics of capacitance 502 during the absence of a first control pulse or two different settings of the resistance of resistance 506. FIG. 6f shows the relative time of occurrence of a first sampling pulse for each of these two different resistance settings of resistance 506.

With one exception, time delay means 410 is identical in structure to time delay means 404. More particularly, since the time delay provided by time delay means 410 is solely a function of the phase shift angle $\alpha$, rather than a function of both the given position azimuth $\phi$ and the phase shift angle $\alpha$, as is the case with time delay means 404, resistance portion 506a of resistance 506 is eliminated in the discharge circuit of time delay means 410. Thus, resistance 506 of time means 410 includes only a single linearly adjustable resistance portion rather than two independent linearly adjustable resistance portions as is the case for time delay means 404. Since the settings of both adjustable resistance portion 506b of time delay means 404 and the adjustable resistance portion of time delay means 410 manifest the value of the phase shift angle $\alpha$ to be entered into the computer, it is preferable that wipers 508b of time delay means 404 and the wiper utilized to control the setting of the adjustable resistance of time delay means 410 be ganged together and manually controlled by a single knob which is calibrated in degrees of phase angle over an interval of at least 360 degrees.

While the accuracy of the distance measurement made by distance meter means 232 does depend upon the absolute amplitude $E_1$ of the reference phase signal, this amplitude will vary by only a few percent above or below a predetermined value from one ground station to another. For most purposes this accuracy of distance measurement is sufficient. However, if even greater accuracy is required, it may be obtained by passing the reference phase output signal from the VOR through a limiter or overdriven amplifier to obtain a 30 hertz square wave having a fixed amplitude independent of any variation in the amplitude of the reference phase output signal from the VOR. This square wave signal can then be passed through a low pass filter to regain a sinusoidal 30 hertz signal having the reference phase and a fixed amplitude which is independent of any variations in the amplitude of the reference phase output signal from the VOR.

What is claimed is:

1. An area navigation method for an aircraft utilizing first and second separate output signals obtained from a VHF-Omnirange Receiver (VOR) aboard said aircraft in response to received radio signals transmitted from a ground station, wherein each of said first and second signals varies substantially sinusoidally at the same given frequency with said first signal having a reference phase and said second signal having a phase with respect to said reference phase which depends on the then-existing azimuth of said aircraft's position with respect to the position of said ground station, and utilizing the output obtained from Distance Measuring Equipment (DME) aboard said aircraft, which output is proportional to the then-existing distance of said aircraft from said ground station, to navigate with respect to a given position which has known fixed predetermined polar coordinates with respect to the position of said ground station; said method comprising the steps of deriving a third sinusoidal signal from said first signal having said given frequency and having an amplitude which is proportional to the distance between said given position and the position of said ground station, deriving a fourth sinusoidal signal from said first signal and the output of said DME having said given frequency and having an amplitude which is proportional to the then-existing distance of said aircraft from said ground station as measured by said DME, sampling the instantaneous amplitude and polarity of said third signal when it has a phase angle equal to the difference between the azimuth of said given position with respect to the position of said ground station and an adjustable phase shift angle, sampling the instantaneous amplitude and polarity of said fourth signal when it has a phase angle equal to the difference between the then-existing azimuth of said aircraft position with respect to the position of said ground station as measured by said second signal and said adjustable phase shift angle, comparing the value of the sampled instantaneous amplitude and polarity of said third signal with the value of the sampled instantaneous amplitude and polarity of said fourth signal, and then adjusting the value of said adjustable phase shift angle to the given value thereof which makes the respective values of the sampled amplitude and polarity of said third and fourth signals equal to each other, whereby said given value of said adjustable phase shift angle manifest the azimuth of said given position with respect to the then-existing position of said aircraft.

2. The method defined in claim 1, wherein said step of comparing comprises the step of indicating the difference between the respective values of the sampled amplitude and polarity of said third and said fourth signals, and the step of adjusting comprises the step of manually adjusting the phase shift angle until a null indication is obtained.

3. The method defined in claim 2, wherein said step of indicating comprises the step of visually displaying said difference.

4. The method defined in claim 3, further including the step after said phase shift angle has been adjusted to said given value thereof of adding a bias signal of a preselected magnitude and polarity which manifests the deviation from a desired course that is spaced a desired distance from but that is parallel to a line connecting the then-existing position of said aircraft with said given position, to the sampled amplitude and polarity of one of said third and said fourth signals to thereby display the deviation from said desired course.

5. The method defined in claim 1, wherein each of said third and fourth signals has said reference phase, wherein said step of sampling the instantaneous amplitude and polarity of said third signal comprises the steps of phase shifting said first signal by an angle equal to the difference between the azimuth of said given position with respect to the position of said ground station and said adjustable phase shift angle, generating a first sampling pulse in response to each zero-crossover of said phase-shifted first signal, and sampling the instantaneous amplitude and polarity of said third signal in response to the occurrence of a first sampling pulse, and wherein the step of sampling the instantaneous amplitude and polarity of said fourth signal comprises the steps of phase shifting said second signal by an angle equal to said adjustable phase shift angle, generating a second sampling pulse in response to each zero degree crossover of said phase-shifted second signal, and sampling the instantaneous amplitude and polarity of said fourth signal in response to the occurrence of a second sampling pulse.

6. The method defined in claim 5, further including the steps of deriving a fifth sinusoidal signal from said first signal having said given frequency and a phase which is in quadrature with said reference phase and having an amplitude which is proportional to the distance between said given position and the position of said ground station, deriving a sixth sinusoidal signal from said first signal and the output of said DME having said given frequency and a phase which is in quardrature with said reference phase and having an amplitude which is proportional to the then-existing distance of said aircraft from said ground station as measured by said DME, sampling the instantaneous amplitude and polarity of said fifth signal in response to the occurrence of a first sampling pulse, sampling the instantaneous amplitude and polarity of said sixth signal in response to the occurrence of a second sampling pulse, and indicating the difference in the respective values of the sampled amplitude and polarity of said fifth and sixth signals, whereby when said adjustable phase shift angle is adjusted to said given value thereof said indicated difference is a manifestation of the distance from the then-existing position of said aircraft to said given position.

7. The method defined in claim 1, wherein each of said third and fourth signals has said reference phase, wherein said step of sampling the instantaneous amplitude and polarity of said third signal comprises the steps of generating a first start signal when said first signal has a first given phase angle with respect to each zero-crossover thereof, generating a first sampling pulse following the occurrence of a first start signal after a time delay corresponding to the difference between the azimuth of said given position with respect to the position of said ground station and the sum of said first given phase angle and said adjugtagle phase shift angle, and sampling the instantaneous amplitude and polarity of said third signal in response to the occurrence of a first sampling pulse, and wherein the step of sampling the instantaneous amplitude and polarity of said fourth signal comprises the steps of generating a second start signal when said second signal has a second given phase angle with respect to each zero-crossover thereof, generating a second sampling pulse following the occurrence of a second start signal after a time delay equal to the sum of said second given phase angle and said adjustable phase shift angle, and sampling the instantaneous amplitude and polarity of said fourth signal in response to the occurrence of a second sampling pulse.

8. The method defined in claim 7, further including the steps of deriving a fifth sinusoidal signal from said first signal having said given frequency and a phase which is in quadrature with said reference phase and having an amplitude which is proportional to the distance between said given position and the position of said ground station, deriving a sixth sinusoidal signal from said first signal and the output of said DME having said given frequency and ap hase which is in quadrature with said reference phase and having an amplitude which is proportional to the then-existing distance of said aircraft from said ground station as measured by said DME, sampling the instantaneous amplitude and polarity of said fifth signal in response to the occurrence of a first sampling pulse, sampling the instantaneous amplitude and polarity of said sixth signal in response to the occurrence of a second sampling pulse, and indicating the difference in the respective values of the sampled amplitude and polarity of said fifth and sixth signals, whereby when said adjustable phase shift angle is adjusted to said given value thereof said indicated difference is a manifestation of the distance from the then-existing position of said aircraft to said given position.

9. Analog computer means for use in the an area navigation system for an aircraft equipped with a VHF-Omnirange Receiver (VOR) and Distance Measuring Equipment (DME), wherein said VOR in response to received radio signals transmitted from a ground station supplies first and second output signals which vary substantially sinusoidally at the same given frequency with said first signal having a referencet phase and said second signal having a phase with respect to said reference phase which depends on the then-existing azimuth of said aircraft position with respect to the position of said ground station, and wherein the output of said DME is proportional to the then-eixsting distance of said aircraft from said ground station, said analog computer means being responsive to said first and second signals and the output from said DME being applied thereto for navigating said aircraft with respect to a given position having known fixed predetermined polar coordinates with respect to the position of said ground station; said computer means comprising first means responsive to said first signal being applied thereto for deriving a third sinusoidal signal having said given frequency and having a first preselected phase with respect to said reference phase, said first means including a first adjustable signal amplitude divider for determining the amplitude of said third signal in accordance with the setting of said first signal amplitude divider, second means responsive to said first signal being applied thereto for deriving a fourth sinusoidal signal having said given frequency and having a second preselected phase with respect to said reference phase, said second means including a second adjustable signal amplitude divider and means for controlling the setting of said second signal amplitude divider in accordance with the output of said DME for determining the amplitude of said fourth signal in accordance with the setting of said second signal amplitude divider to thereby render the amplitude of said fourth signal proportional to the then-existing distance of said aircraft from said ground station as measured by said DME, third means for sampling the instantaneous amplitude and polarity of said third signal when it has a phase angle equal to the difference between the azimuth of said given position with respect to the position of said ground station and an adjustable phase shift angle, fourth means for sampling the instantaneous amplitude and polarity of said fourth signal when it has a phase angle equal to the difference between the then-existing azimuth of said aircraft position with respect to the position of said ground station as measured by said second signal and said adjustable phase shift angle, fifth means for comparing the value of the sampled instantaneous amplitude and polarity of said third signal with the value of the sampled instantaneous amplitude and polarity of said fourth signal, whereby by adjusting the setting of said first signal amplitude divider to make the amplitude of said third signal proportional to the known fixed predetermined distance between said given position and the position of said ground station and by adjusting the value of said adjustable phase shift angle to that given value thereof which makes the values of the respective sampled instantaneous amplitude and polarities of said third and fourth signals equal to each other said given value of phase shift angle will manifest the azimuth of said given position with respect to the then-existing position of said aircraft.

10. The computer means defined in claim 9, wherein said means for comparing includes a DC meter for indicating the difference between the values of the respective sampled amplitude and polarity of said third and fourth signals, whereby a null indication by said DC meter manifests said given value of said phase shift angle.

11. The computer means defined in claim 10, further including adjustable bias means for selectively adding a bias signal of a preselected magnitude and polarity, which manifests the deviation from a desired course that is spaced a desired distance from but that is parallel to a line connecting the then-existing position of said aircraft with said given position, to the sampled amplitude and polarity of one of said third and fourth signals to thereby display on said DC meter the deviation from said desired course.

12. The computer means defined in claim 9, wherein each of said second and third means, respectively, includes sampling and holding means for maintaining the amplitude and polarity of each successive sample of said respective third and fourth signals substantially constant until the occurrence of the next subsequent sample thereof.

13. The computer means defined in claim 9, wherein said first preselected phase of said third signal and said second preselected phase of said fourth signal are both equal to said reference phase, wherein said third means includes first adjustable phase shift means having said first signal applied thereto for phase shifting said first signal by an angle with respect to a period of said given frequency equal to the difference of the azimuth of said given position with respect to the position of said ground station and said adjustable phase shift angle, means for generating a first sampling pulse in response to each zero-degree crossover of said phase-shifted first signal and means for sampling the instantaneous amplitude and polarity of said third signal in response to the occurrence of a first sampling pulse, and wherein said fourth means includes second adjustable phase shift means having said second signal applied thereto for phase shifting said second signal by an angle with respect to a period of said given frequency equal to said adjustable phase shift angle, means for generating a second sampling pulse in response to each zero-degree crossover of said phase-shifted second signal, and means for sampling the instantaneous amplitude and polarity of said fourth signal in response to the occurrence of a second sampling pulse.

14. The computer means defined in claim 13, wherein said first means further includes means for deriving a fifth sinusoidal signal from said first signal having said given frequency and a phase which is in quadrature with said reference phase and having an amplitude which is proportional to the distance between said given position and the position of said ground station, and means for sampling the instantaneous amplitude and polarity of said fifth signal in response to the occurrence of a first sampling pulse, wherein said second means further includes means for deriving a sixth sinusoidal signal from said first signal and the output of said DME having said given frequency and a phase which is in quadrature with said reference phase and having an amplitude which is proportional to the then-existing distance of said aircraft from said ground station as measured by said DME, and means for sampling the instantaneous amplitude and polarity of said sixth signal in response to the occurrence of a second sampling pulse, and further including meter means for measuring the difference between the values of the respective sampled amplitude and polarity of said fifth and sixth signals, whereby when said phase shift angle has said given value the measurement provided by said meter means is proportional the distance between said given position and the then-existing position of said aircraft.

15. The computer means defined in claim 14, wherein said first and second phase shift means and said first signal amplitude divider are manually adjustable.

16. The computer means defined in claim 9, wherein said first preselected phase of said third signal and said second preselected phase of said fourth signal are both equal to said reference phase, wherein said third means includes a first control pulse generator having said first signal applied thereto for generating a first start signal when said first signal has a first given phase angle with respect to each zero crossover thereof, first time delay means coupled to said first control pulse generator and responsive to a first start signal for generating a first sampling pulse following the occurrence of that first start signal after a time delay with respect to a period of said given frequency corresponding to the difference of the azimuth of said given position with respect to the position of said ground station and the sum of said first given phase angle and said adjustable phase shift angle, and means for sampling the instantaneous amplitude and polarity of said third signal in response to the occurrence of a first sampling pulse, and wherein said fourth means includes a second control pulse generator having said second signal applied thereto for generating a second start signal when said second signal has a second given phase angle with respect to each zero-degree crossover thereof, a second time delay means coupled to said second control pulse generator and responsive to a second start signal for generating a second sampling pulse following the occurrence of that second start signal after a time delay with respect to a period of said given frequency equal to the sum of said second given phase angle and said adjustable phase shift angle, and means for sampling the instantaneous amplitude and polarity of said fourth signal in response to the occurrence of a second sampling pulse.

17. The computer means defined in claim 16, wherein said first means further includes means for deriving a fifth sinusoidal signal from said first signal having said given frequency and a phase which is in quadrature with said reference phase and having an amplitude which is proportional to the distance between said given position and the position of said ground station, and means for sampling the instantaneous amplitude and polarity of said fifth signal in response to the occurrence of a first sampling pulse, wherein said second means further includes means for deriving a sixth sinusoidal signal from said first signal and the output of said DME having said given frequency and a phase which is in quadrature with said reference phase and having an amplitude which is proportional ot the then-existing distance of said aircraft from said ground station as measured by said DME, and means for sampling the instantaneous amplitude and polarity of said sixth signal in response to the occurrence of a second sampling pulse, and further including meter means for measuring the difference between the values of the respective sampled amplitude and polarity of said fifth and sixth signals, whereby when said phase shift angle has said given value the measurement provided by said meter means is proportional the distance between said given position and the then-existing position of said aircraft.

18. The computer means defined in claim 16, wherein each of said first and second start signals is the leading edge of first and second control pulses respectively generated by said first and second generators, each control pulse having a duration greater than one period of said first and second signals, and wherein each of said first and second time delay means includes first and second terminals adapted to be connected to a source of fixed voltage, voltage divider resistance means having one end thereof connected to said first terminal and the other end thereof connected to said second terminal, a given capacitance, a charging circuit for said capacitance including a pulse controlled switch means for connecting said capacitance across said first and second terminals only when said switch means is in a closed position, wherein said first time delay means further includes a discharging circuit for said capacitance thereof including first and second serially connected independent linearly-adjustable resistances having a predetermined maximum value and a predetermined minimum value connected across said capacitance thereof, said switch means of said time delay means having a first control pulse applied thereto for effecting the switching thereof from a closed position to an open position during the occurrence of an applied first control pulse, and first comparison means having a first input thereof connected to a point of said voltage divider resistnace means of said first time relay means intermediate the ends thereof, said first comparison means having a second input thereof connected to said charged capacitance of said first time delay means for generating said first sampling pulse in response to the potential difference between said first and second inputs of said first comparison means reaching a predetermined value during the discharge of said capacitance of said first time delay means, and wherein said second time delay means further includes a discharging circuit for said capacitance thereof including linearly-adjustable third resistance having a predetermined maximum value and a predetermined minimum value connected across said capacitance thereof, said switch means of said second time delay means having a second control pulse applied thereto for effecting the switching thereof from a closed position to an open position during the occurrence of an applied second control pulse, and second comparison means having a first input thereof connected to a point of said voltage divider resistance means of said second time delay means intermediate the ends thereof, said second comparison means having a second input thereof connected to said charged capacitance of said second time delay means for generating said second sampling pulse in response to the potential difference between said first and second inputs of said second comparison means reaching a predetermined value during the discharge of said capacitance of said second time delay means.

19. The computer means defined in claim 18, wherein said point of said voltage divider resistance means of said first time delay means is chosen so that said first time delay means provides a first given time delay when said first resistance is adjusted to have its maximum resistance and said second resistance is adjusted to have its minimum resistance, provides a second given time delay when said second resistance has its maximum resistance and said first resistance has its minimum resistance, and provides a third given time delay equal to said first given phase angle when both said first and second resistances have their respective minimum resistance, each of said first and second given time delays exceeding said third given time delay by at least the duration of one period of said given frequency of said first and second signals, and wherein each of said first and second resistances includes independent adjusting means calibrated in terms of phase angles with respect to said reference phase of said first signal, said point of said voltage divider resistance means of said second time delay means is chosen so that said second time delay means provides a fourth given time delay when said third resistance has its maximum resistance and a fifth given time delay equal to said second given phase angle when said third resistance has its minimum resistance, said fourth given time delay exceeding said fifth given time delay by at least the duration of one period of said given frequency of said first and second signals, and wherein said third resistance includes adjusting means calibrated in terms of phase angle with respect to the variable phase of said second signal, whereby said adjusting means of said first resistance can be set to the azimuth of said given position with respect to said ground station, and the respective adjusting means of each of said second and said third resistances can be set to said given value of phase shift angle.

20. The computer means defined in claim 19, wherein said adjusting means of said second resistance of said first time delay means and said adjusting means of said third resistance of said second time delay means, each of which manifests phase shift angle, are ganged together.

References Cited

UNITED STATES PATENTS

| | | | |
|---|---|---|---|
| 2,717,735 | 9/1955 | Luck | 235—191 X |
| 3,078,041 | 2/1963 | Bomberger | 235—150.27 X |
| 3,414,901 | 12/1968 | Perkins et al. | 244—77 X |
| 3,478,360 | 11/1969 | Hirsch | 343—106 |

MALCOM A. MORRISON, Primary Examiner

F. D. GRUBER, Assistant Examiner

U.S. Cl. X.R.

235—150.53, 186; 324—83; 328—151; 343—106, 107